United States Patent [19]

Oyama et al.

[11] Patent Number: 5,475,913
[45] Date of Patent: Dec. 19, 1995

[54] METHOD FOR ASSEMBLING FUEL ASSEMBLY

[75] Inventors: Junichi Oyama; Katsunori Ohuchi, both of Naka; Shunji Ono, Kobe; Toshiyuki Kawagoe, Funabashi, all of Japan

[73] Assignee: Mitsubishi Nuclear Fuel Co., Tokyo, Japan

[21] Appl. No.: 230,240

[22] Filed: Apr. 20, 1994

[30] Foreign Application Priority Data

Apr. 20, 1993 [JP] Japan ............................ 5-093409

[51] Int. Cl.⁶ ............................................ B21D 39/00
[52] U.S. Cl. ........................................ 29/523; 29/906
[58] Field of Search ......................... 29/723, 906, 523; 376/261, 434, 438

[56] References Cited

U.S. PATENT DOCUMENTS

| | | |
|---|---|---|
| 3,791,466 | 2/1974 | Patterson et al. |
| 4,229,259 | 10/1980 | Vaill et al. ............................... 29/723 |
| 4,638,556 | 1/1987 | Shallenberger et al. .................. 29/906 |
| 4,653,180 | 3/1987 | LePargneux et al. ..................... 29/906 |

FOREIGN PATENT DOCUMENTS

| | | |
|---|---|---|
| 0076748 | 4/1983 | European Pat. Off. |
| 0123055 | 10/1984 | European Pat. Off. |

OTHER PUBLICATIONS

Database WPI, Derwent Publications, AN 86–289101 & JP–A–61 212 796, Sep. 20, 1986.

*Primary Examiner*—David P. Bryant
*Attorney, Agent, or Firm*—Oblon, Spivak, McClelland, Maier, & Neustadt

[57] ABSTRACT

A method of assembling a fuel assembly is presented so as to reduce radiation exposure to the assembly workers and to simplify the assembly procedure. Sleeves are pre-attached to an upper nozzle, and the guide pipes are inserted into respective grid cells through the sleeves of the upper nozzle and through the sleeves of the grids. The guide pipes are fixed in place to the sleeves of the upper nozzle and of the grids by bulging. There is no welding step necessary to join any of the assembly components while the assembly is in a semi-assembled condition. Therefore, the method is simple and efficient, and reduces the risk of radiation exposure to the assembly workers.

4 Claims, 4 Drawing Sheets

METHOD FOR ASSEMBLING FUEL ASSEMBLY

BACKGROUND OF THE INVENTION

1. Field of the Invention

The present invention relates to a method for assembling a fuel assembly in general, and relates in particular to an efficient method for fixating an upper nozzle to control rod guide pipes through sleeves.

2. Technical Background

In general, a fuel assembly such as the one illustrated in FIG. 6 is known. This assembly comprises: an upper nozzle 1; a lower nozzle 2; a plurality of grids 3 disposed between the nozzles 1 and 2 with predetermined spacing and each having grid spaces formed by intersecting straps; a plurality of guide pipes 4; and a plurality of fuel rods 5 disposed in corresponding cells of each grid. The guide pipes 4 are inserted and fixed to the grids 3 and to the nozzles 1, 2. The fuel rods 5 inserted into the grid cells are held elastically by the springs formed in the grids 3.

Conventional steps for assembling this type of assembly are as follows: first, a semi-assembled member 6 comprising the lower nozzle 2, a plurality of grids 3, the guide pipes 4 and the fuel rods 5 is prepared. Following this step, the upper nozzle 1 disposed above the semi-assembled member 6 is engaged with the top ends of the guide pipes 4, and the top ends are fixated to the upper nozzle 1 by welding to produce a fuel assembly.

In such a conventional process of assembling the upper nozzle 1 to the the top ends of the semi-assembled member 6, it is necessary to weld the upper nozzle 1 to the lengthy body of the semi-assembled member 6. Such a procedure demands expertise and is also time consuming. Furthermore, the welding operations are carried out in proximity to the fuel rods, and the workers were exposed to relatively high doses of radiation.

Therefore, there has been a need for an improvement in the assembling method, from the viewpoints of reducing the radiation exposure to the worker as well as achieving efficiency in assembling operation.

In the field of technology of fixing the upper nozzle 1 to the top ends of the semi-assembled member 6, other methods of assembling are known. For example, in one method known as the detachable upper nozzle method, the upper nozzle 1 is engaged with the top ends of the assembled member by means of inner sockets disposed on the top ends of the guide pipes; individual outer sockets formed within the upper nozzle 1; and locking member which keeps the inner sockets engaged with the outer sockets (refer to Japanese Patent, First Publication, Sho60-93988, JP, First Publication, Sho61-226686, JP, First Publication, Sho62-116290). Other methods include a bulging method, which involves engaging a sleeve disposed on the upper nozzle with the guide pipe and bulging the sleeve part (refer to the above-mentioned JP Sho62-116290, JP, First Publication, Sho55-125479, JP, First Publication, Hei2-196997).

Even in these methods, however, the fundamental problems still exist as in the conventional method of assembling the fuel assembly that there is a risk of radiation exposure to the assembly workers and that the assembling steps are time-consuming.

SUMMARY OF THE PRESENT INVENTION

The present invention is presented to resolve the above mentioned problems, and the purpose is to present a method to quickly and reliably fixate the upper nozzle to the top ends of the guide pipes, and to reduce the time necessary for working in the vicinity of the fuel rods as much as possible.

This objective is achieved in a method for assembling a fuel assembly having: an upper nozzle and a lower nozzle separated at a distance from said upper nozzle; and a plurality of grids disposed between said upper nozzle and said lower nozzle with pre-determined spacing, each having grid spaces formed by intersecting straps; guide pipes inserted in said grid spaces of said grids and connected to said grids, said upper nozzle and said lower nozzle; and fuel rods inserted into said grid spaces of said grids; said method comprising the steps of: inserting fuel rods in said grid spaces of said grids; inserting guide pipes in sleeves of said upper nozzle which had been pre-fixated with sleeves, and in grid spaces with sleeves of said grids which had been pre-fixated with sleeves and positioning said guide pipes in said sleeves of said upper nozzle and of said grids; performing bulging operations for fixating said guide pipes to the sleeves of said grids, and to the sleeves of said upper nozzle successively.

In one aspect of the invention, the sleeves are pre-installed on the upper nozzle by welding.

In another aspect of the invention, the sleeves are pre-attached on the upper nozzle by a mechanical method.

In yet another aspect of the invention, an end plug of the guide pipe is inserted into an insert member provided on the bottommost grid adjacent to the lower nozzle and the end plug and the lower nozzle are connected mechanically with an thimble screw arrangement so as to connect the lower nozzle with the guide pipe.

According to the method of the present invention for assembling the fuel assembly, one bulging operation is sufficient to fix in place the guide pipes to the sleeves of the upper nozzle and to the sleeves of the grids.

An advantage of this method is that it becomes possible to fix the guide pipes efficiently and reliably to the upper nozzle without risking the assembly workers to radiation exposure, because the workers are not required to work close to the fuel rods over an extended period of time. The overall assembling operations is simplified, thus reducing as much as possible the time required to work in the vicinity of the fuel rods. The method is therefore effective in reducing the radiation exposure of the workers as well as achieving efficient assembling operation.

This advantage is effected by the fact that the upper nozzle and the sleeves may be fixated to each other in a separate work location, by using welding or other mechanical techniques. This pre-assembled upper nozzle eliminates time consuming on-site welding, thus achieving a simplified assembling procedure as well as reducing the radiation exposure of the workers.

PREFERRED EMBODIMENT

An embodiment of the method of assembling the fuel assembly according to the present invention will be explained with reference to FIGS. 1 to 5. Explanations are omitted for the parts which are the same as in the conventional parts will be referred to by the same name.

Figure 1:
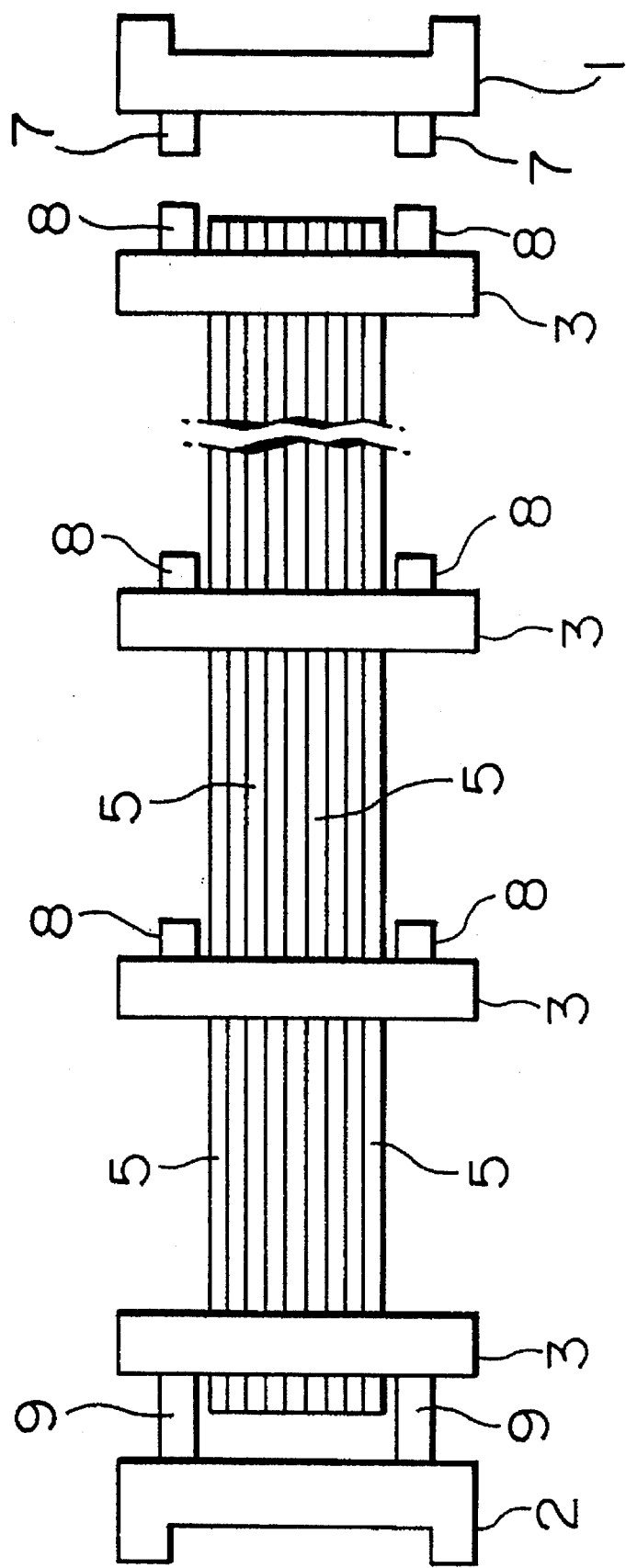
FIG. 1 is a schematic illustration of an embodiment in the course of assembling process.
Figure 2:
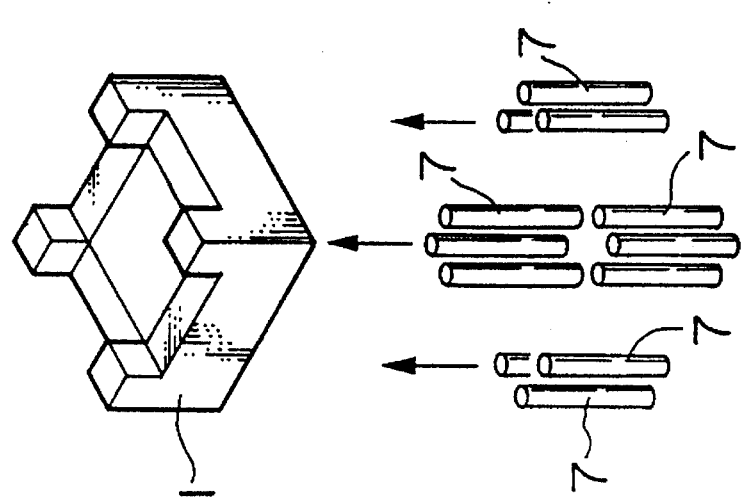
FIG. 2 is a perspective view of the arrangement of the sleeves to be fixated to the upper nozzle.
Figure 3:
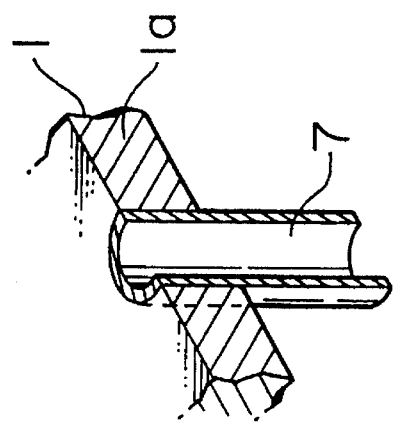
FIG. 3 is a perspective partial cross sectional view of a weld for fixing the sleeve to the upper nozzle.
Figure 4:
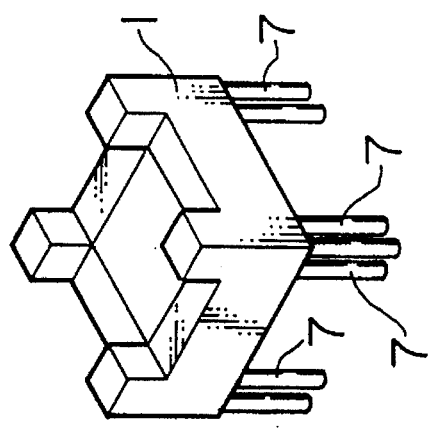
FIG. 4 is a perspective view of the upper nozzle having the sleeves fixed in place.

In the method of this embodiment, first, a plurality of grids 3 are disposed at a predetermined spacing. Then the plurality of fuel rods 5 are inserted in the respective grid cells of the grids 3. Next, the upper nozzle 1 with pre-welded sleeves 7 and the lower nozzles 2 are arranged in place, as shown in FIG. 1. The upper nozzle 1 with the pre-welded sleeves 7 is prepared by following the steps illustrated in FIGS. 2 to 4, i.e., a plurality of sleeves 7 are first inserted into the respective holes provided on the end plate 1a of the upper nozzle 1. FIGS. 2 and 4 illustrate an example of fixing three sleeves 7 to each of the four corner sections of the end plate of the upper nozzle 1. The sleeves 8 are also attached to the grid cells of the grids 3.

Figure 5:
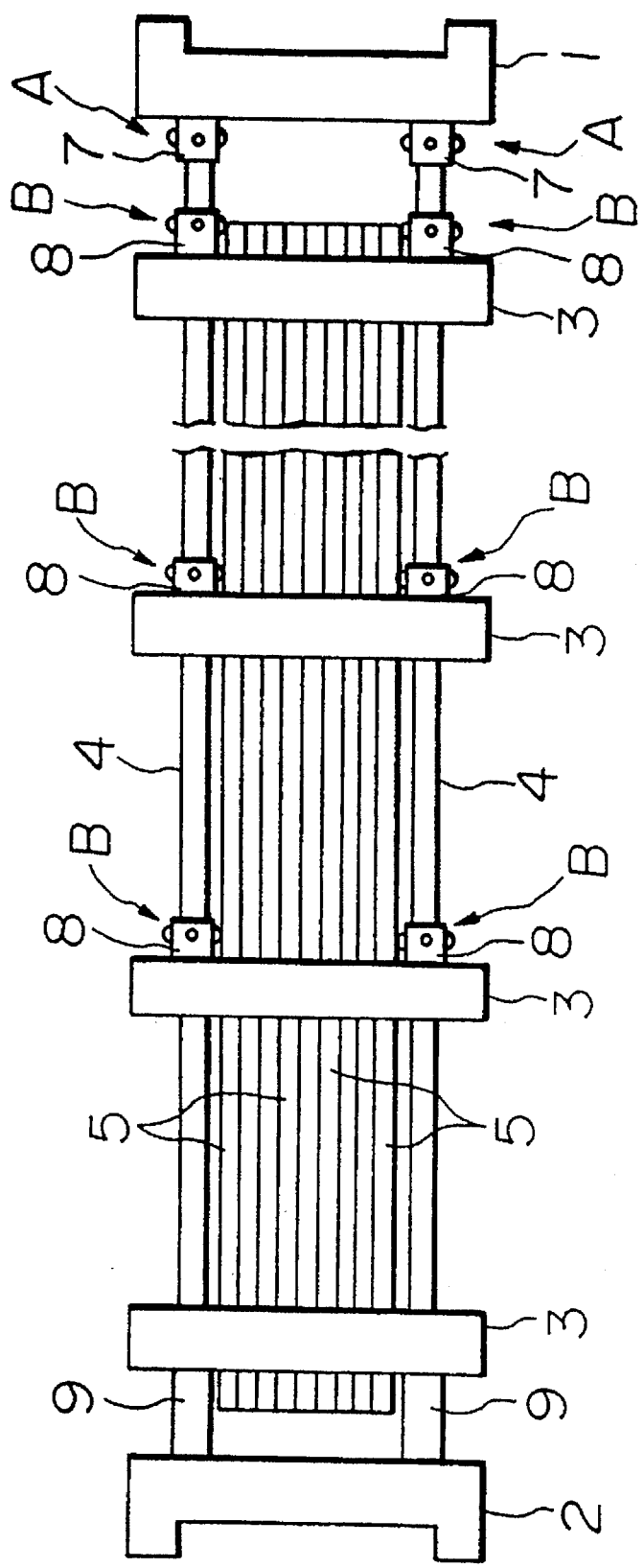
FIG. 5 is a fuel assembly assembled by the method of the embodiment of the present invention.
Figure 6:
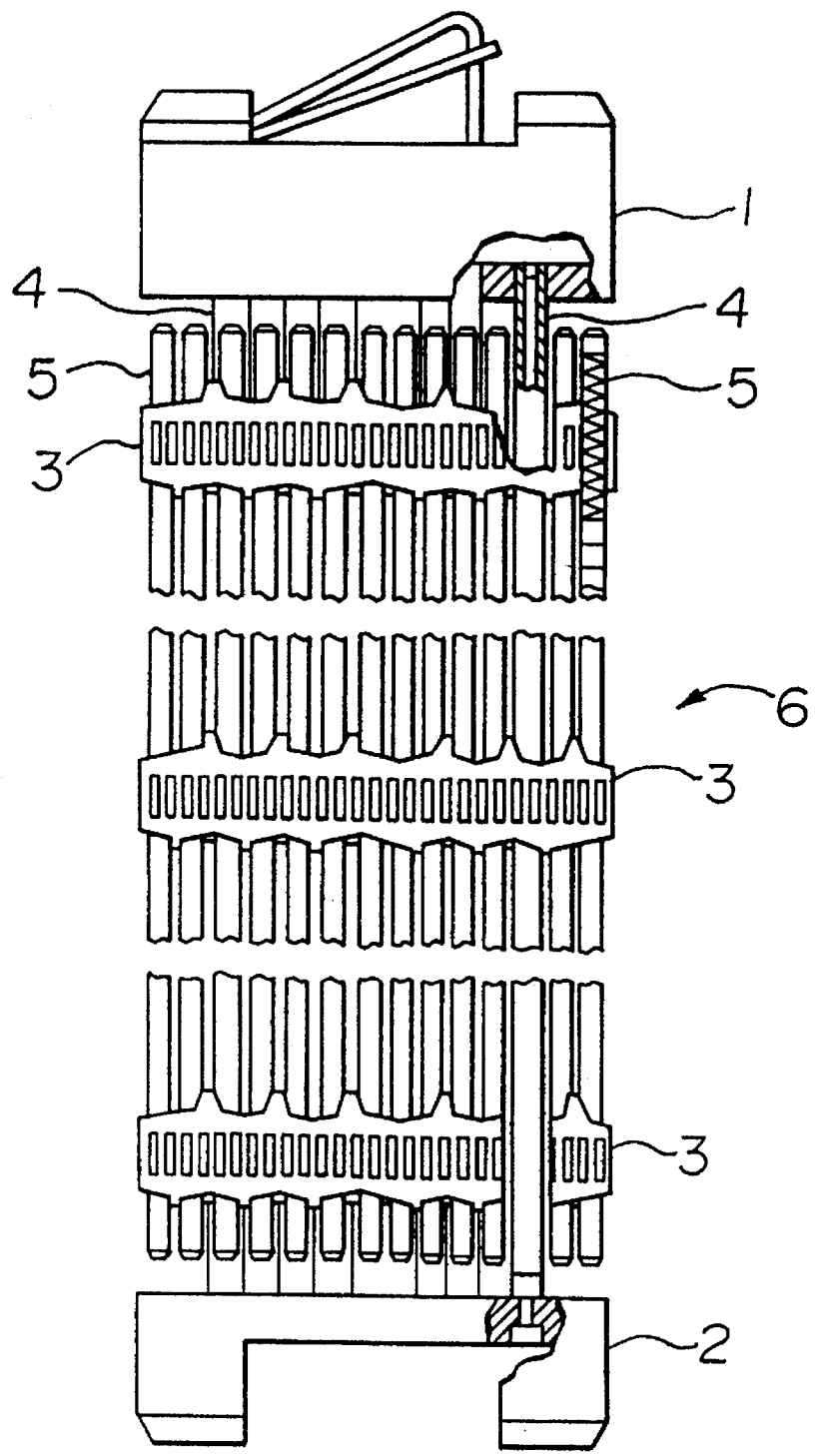
FIG. 6 is a partially exposed front view of a conventional fuel assembly.

The above step is followed by the step of inserting guide pipes 4 through the sleeves 7 of the upper nozzle 1, into the plurality of grids with sleeves 8, and into the bottommost grid with inserts 9, all of which are arranged as shown in FIG. 5. Subsequently, the end plug of the guide pipe 4 housed in the insert 9 and the lower nozzle 2 are connected together with a thimble screw.

Next, the guide pipes 4 are fixated to the sleeves 8 of one grid 3 to other grids 3 and to the sleeves 7 successively by bulging.

In FIG. 5, the reference mark A indicates the joint regions between the guide pipe 4 and the sleeve 7 which are fixated by bulging, and the reference mark B indicates the joint regions between the guide pipe 4 and the sleeves 8 of the grids 3 which are fixated by bulging.

As described above, by performing the bulging process successively, the guide pipe 4 and the grids 3, (excepting the bottommost grid) on the one hand, and the guide pipe 4 and the upper nozzle 1 on the other hand, can be joined, without the need to use the welding process in the vicinity of fuel rods as in the conventional fixation methods. Because there is only one fixating process involved in the assembling of the fuel assembly, the assembly operation can be carried out quickly and reliably.

In the above embodiment, the upper nozzle 1 and the sleeve 7 were pre-welded in place, but the joining method is not limited to this, and the upper nozzle 1 and the sleeve 7 may be fixated in place by mechanical methods. This pre-welding is carried out at a different site than the assembling site to increase the efficiency of the assembling process.

What is claimed is:

1. A method for assembling a fuel assembly having: an upper nozzle which has been pre-fixated with first sleeves and a lower nozzle separated at a distance from said upper nozzle; and a plurality of grids which have been pre-fixated with second sleeves disposed between said upper nozzle and said lower nozzle with pre-determined spacing, each grid having grid spaces formed by intersecting straps; guide pipes inserted in said grid spaces of said grids and connected to said grids, said upper nozzle and said lower nozzle; and fuel rods inserted into said grid spaces of said grids;

said method comprising the steps of:

inserting the fuel rods in said grid spaces of said grids;

inserting each of said guide pipes through each of said first sleeves of said upper nozzle and then into said second sleeves of said grids, such that said guide pipes are positioned in said first sleeves of said upper nozzle and said second sleeves of said grid; and performing bulging operations for fixating each of said guide pipes to the second sleeves of said grids, and to the first sleeves of said upper nozzle successively.

2. A method as claimed in claim 1, wherein said first sleeves are pre-installed on said upper nozzle by welding.

3. A method as claimed in claim 1, wherein said first sleeves are pre-attached on said upper nozzle by a mechanical method.

4. A method as claimed in claim 1, wherein an end plug of said guide pipe is inserted into an insert member provided on the bottommost grid adjacent to said lower nozzle and said end plug and said lower nozzle are connected mechanically with an thimble screw arrangement so as to connect said lower nozzle with said guide pipe.

\* \* \* \* \*